US011236666B2

(12) United States Patent
Golz et al.

(10) Patent No.: US 11,236,666 B2
(45) Date of Patent: Feb. 1, 2022

(54) FLAP ARRANGEMENT FOR A TURBINE OF AN EXHAUST-GAS TURBOCHARGER

(71) Applicant: BorgWarner Inc., Auburn Hills, MI (US)

(72) Inventors: Marcel Golz, Neckarsteinach (DE); Jason Robert Walkingshaw, Heidelberg (DE); Jens Watanpour, Viernheim (DE); Anna Gilbert, Mannheim (DE)

(73) Assignee: BorgWarner Inc., Auburn Hills, MI (US)

( * ) Notice: Subject to any disclaimer, the term of this patent is extended or adjusted under 35 U.S.C. 154(b) by 124 days.

(21) Appl. No.: 16/701,286

(22) Filed: Dec. 3, 2019

(65) Prior Publication Data

US 2020/0173349 A1 Jun. 4, 2020

(30) Foreign Application Priority Data

Dec. 4, 2018 (DE) .......................... 102018220965.0

(51) Int. Cl.
*F02B 37/18* (2006.01)
*F04D 29/42* (2006.01)
(Continued)

(52) U.S. Cl.
CPC ............ *F02B 37/183* (2013.01); *F04D 17/10* (2013.01); *F04D 27/0215* (2013.01); *F04D 29/4206* (2013.01)

(58) Field of Classification Search
CPC .... F02B 37/183; F04D 17/10; F04D 27/0215; F04D 29/4206; F01D 17/10; F01D 17/145
(Continued)

(56) References Cited

U.S. PATENT DOCUMENTS 3,294,360 A * 12/1966 Lundberg .................. F16K 1/36
251/205
3,664,371 A * 5/1972 Schneider ............. F16K 15/028
137/516.29
(Continued)

FOREIGN PATENT DOCUMENTS

DE 102009050182 A1 5/2011
DE 202013006731 U1 8/2013
(Continued)

OTHER PUBLICATIONS

English language abstract and machne-assisted English translation for DE 10 2009 050 182 A1 extracted from espacenet.com database on Mar. 18, 2021, 8 pages.
(Continued)

*Primary Examiner* — J. Todd Newton
(74) *Attorney, Agent, or Firm* — Howard & Howard Attorneys PLLC

(57) ABSTRACT

The invention concerns a flap arrangement 10 for a turbine 2 of an exhaust-gas turbocharger 2, in particular for a wastegate valve of the turbine, having a spindle 100 for rotatable mounting of the flap arrangement 10 in a turbine housing 3, a lever arm 200, the lever arm 200 being coupled to the spindle 100, and a flap plate 300, the flap plate 300 being coupled to the lever arm 200. The flap plate 300 has a flexible part 330 in a radially outer region of the flap plate 300, such that by applying a closing force to the flap arrangement 10 when the flap plate 300 is in contact with a flap seat 500 in the turbine housing 3, elastic and/or plastic deformation of the flexible part 330 of the flap plate 300 can be caused to compensate for thermal deformation of the turbine housing 3, exhaust deposits and/or wear.

20 Claims, 5 Drawing Sheets

(51) Int. Cl.
*F04D 17/10* (2006.01)
*F04D 27/02* (2006.01)

(58) Field of Classification Search
USPC .................................................. 415/144, 145
See application file for complete search history.

(56) References Cited

U.S. PATENT DOCUMENTS

| | | | | |
|---|---|---|---|---|
| 4,351,292 | A * | 9/1982 | Worthen | F01L 3/04 123/188.2 |
| 5,172,552 | A * | 12/1992 | Elpern | F02B 37/183 60/602 |
| 10,119,549 | B2 | 11/2018 | Tschirschke | |
| 10,598,082 | B2 * | 3/2020 | Marsal | F16K 1/205 |
| 2008/0073605 | A1 * | 3/2008 | Ishigaki | F16K 15/16 251/12 |
| 2009/0028694 | A1 * | 1/2009 | Naemura | F02B 37/18 415/145 |
| 2009/0205333 | A1 * | 8/2009 | Bielass | F02B 37/16 60/605.1 |
| 2012/0191321 | A1 * | 7/2012 | Ibuki | F02D 41/0007 701/102 |
| 2015/0125273 | A1 | 5/2015 | Tschirschke | |
| 2015/0292395 | A1 | 10/2015 | Dilalan et al. | |
| 2017/0030261 | A1 * | 2/2017 | Yasoshima | F02B 37/183 |
| 2017/0284285 | A1 * | 10/2017 | Lenk | F02B 39/16 |
| 2017/0343114 | A1 * | 11/2017 | Cizek | F02B 39/00 |
| 2018/0058341 | A1 * | 3/2018 | Kuske | F02D 9/1015 |
| 2018/0156105 | A1 * | 6/2018 | Igarashi | F02B 37/186 |
| 2019/0003376 | A1 * | 1/2019 | Schawer | F16C 17/02 |

FOREIGN PATENT DOCUMENTS

| | | |
|---|---|---|
| DE | 20 2014 007 538 | 10/2014 |
| DE | 202014007538 U1 | 10/2014 |
| DE | 11 2013 002 306 | 2/2015 |
| DE | 112013002306 T5 | 2/2015 |
| EP | 2489853 A1 | 8/2012 |
| EP | 3252285 A1 | 12/2017 |
| NL | 1040955 B1 | 9/2016 |
| WO | 2019075210 A1 | 4/2019 |

OTHER PUBLICATIONS

Machine-assisted English language abstract and machne-assisted English translation for DE 20 2013 006 731 U1 extracted from espacenet.com database on Mar. 18, 2021, 9 pages.
Machine-assisted English language abstract and machine-assisted English translation for DE 20 2014 007 538 extracted from espacenet.com database on Dec. 11, 2019, 10 pages.
English language abstract for DE 11 2013 002 306 extracted from espacenet.com database on Dec. 11, 2019, 1 page.

* cited by examiner

FLAP ARRANGEMENT FOR A TURBINE OF AN EXHAUST-GAS TURBOCHARGER

CROSS REFERENCE TO RELATED APPLICATIONS

This application claims the benefit of German Application No. 102018220965.0 filed Dec. 4, 2018, the disclosure of which is herein incorporated by reference in its entirety.

FIELD OF THE INVENTION

The present invention concerns a flap arrangement for a turbine of an exhaust-gas turbocharger as well as a turbine and an exhaust-gas turbocharger with a corresponding flap arrangement.

BACKGROUND OF THE INVENTION

Known exhaust-gas turbochargers feature a turbine with a turbine wheel driven by the exhaust gas stream of the combustion engine. A compressor wheel mounted on a common shaft with the turbine wheel compresses the fresh air drawn in for the engine, increasing the pressure of the fresh air. This increases the amount of air or oxygen available to the engine for combustion, which in turn increases the performance of the combustion engine. Due to the coupling of the turbine wheel with the compressor wheel, the pressure to be generated always depends on the amount of exhaust gas conveyed. In certain operating conditions it is necessary to reduce or control the drive energy acting on the compressor.

Wastegate valves are used for this purpose among others and can release or close a bypass or wastegate channel. Exhaust gases can be routed through the wastegate valve and the bypass and thus around the turbine, so that the complete amount of exhaust gas no longer acts on the turbine wheel. These wastegate valves are usually designed as flap valves which are actuated by an actuator. In known flap arrangements, a flap plate is permanently connected to a lever arm, wherein the lever arm is coupled to a spindle which is rotatably mounted in the turbine housing. The hot exhaust-gas stream heats up the turbine strongly such that the turbine housing reaches high temperatures. The high temperatures lead to thermal expansion in the turbine housing. However, since the same temperatures do not prevail everywhere and the wall thicknesses can vary in corresponding areas of the turbine housing, the thermal expansion is not the same everywhere. This can result in deformations of the flap seat of the flap arrangement in the turbine housing. In addition, the shape of the flap seat may change due to wear and exhaust gas deposits. Such deformations are problematic because they lead to leakage, especially with rigid flap arrangements, since the rigid valve disc no longer rests flat on the flap seat. Increased leakage in turn leads to loss of performance. Even with an excessive actuating force by the actuator, the problem of deformations can only be partially compensated.

The aim of the present invention is therefore to provide a flap arrangement for a turbine of an exhaust-gas turbocharger which is capable of compensating for the deformations.

SUMMARY OF THE INVENTION

The present invention concerns a flap arrangement for a turbine according to claim 1, a turbine according to claim 14 and an exhaust-gas turbocharger according to claim 15.

The inventive flap arrangement for a turbine of an exhaust-gas turbocharger, in particular for a wastegate valve of the turbine, comprises a spindle for rotatably mounting the flap arrangement in a turbine housing, a lever arm, the lever arm being coupled to the spindle, and a flap plate, the flap plate being coupled to the lever arm. According to the invention, the flap plate has a flexible portion in a radially outer region of the flap plate, so that by applying a closing force to the flap arrangement when the flap plate is in contact with a flap seat in the turbine housing, elastic and/or plastic deformation of the flexible portion of the flap plate can be caused to compensate for thermal deformation of the turbine housing, exhaust deposits and/or wear. The flexible design of an area of the flap plate allows the flap plate to adapt to the changed shape/position of the flap seat when force is applied appropriately, wherein the force applied in order to overcome a gap caused by thermal deformations of the turbine housing, exhaust deposits and/or wear can be kept to a minimum compared to known rigid flap arrangements. In addition, the inventive flap arrangement leads to an improved seat of the flap plate on the flap seat and consequently to a better sealing of the wastegate channel. Furthermore, "sticking" of the flap plate in the flap seat, which can occur due to deformation of the flap seat, is better avoided.

In some embodiments, the disc may also feature a rigid portion, with the flexible portion surrounding the rigid portion.

In embodiments that can be combined with any of the previously described embodiments, the valve disc can be circular or oval, and the flexible portion can be a ring-shaped area.

In embodiments that can be combined with any of the previously described embodiments, the flap plate can have an underside, the underside having an underside surface $U_A$, and the underside surface $U_A$ comprising a first partial surface $T_F$ associated with the flexible portion and a second partial surface $T_S$ associated with the rigid portion.

In particular, the first partial area $T_F$ may be greater than or equal to 0.2 times the underside area $U_A$, in particular greater than or equal to 0.4 times the underside area $U_A$, particularly preferably greater than or equal to 0.5 times the underside area $U_A$.

In embodiments that can be combined with any of the previously described embodiments, the flap plate can have a contact point A on the edge of the flap plate which, in the installed state, comes into contact first with the flap seat during the closing process of the flap arrangement, wherein a lever length $L_H$ can be defined as the distance between the contact point A and a geometric center of gravity C of the second partial surface $T_S$, and a maximum length $L_{Max}$ can be defined as the maximum distance between two opposing points on the edge of the flap plate. In particular, the following can apply to the ratio of $L_H$ to $L_{Max}$: $0.20 \leq L_H/L_{Max} \leq 0.95$, in particular $0.40 \leq L_H/L_{Max} \leq 0.90$. In addition, a flex length LE can be defined as the distance between the point of contact A and an outer edge of the second partial surface $T_S$, wherein the following can apply to a ratio $L_F/L_H$: $0.20 \leq L_F/L_H \leq 0.95$, in particular $0.40 \leq L_F/L_H \leq 0.95$.

In embodiments that can be combined with any of the previously described embodiments, the flap plate can have a thickness $D_t$ in the region of an outer edge of the flexible portion. The entire flexible portion of the flap plate can have a constant thickness corresponding to the thickness $D_t$. Alternatively, the flexible portion of the flap plate may have different thicknesses, especially in the radial direction from the outer edge towards the rigid portion. The thickness of the flexible portion can increase in the radial direction towards the rigid portion. Alternatively, the thickness of the flexible portion can decrease in the radial direction towards the rigid portion.

In embodiments that can be combined with any of the previously described embodiments, at least one recess may be provided on an underside and/or an upper side of the flexible portion. The flexibility in the flexible portion can be specifically adapted or increased through the recess(es). The at least one recess may be in the form of at least one groove arranged in the circumferential direction. In particular, the groove may be a closed groove along the circumferential direction or extend over at least a portion of the circumference.

In embodiments that can be combined with any of the previously described embodiments, at least part of the lever arm can be flexible such that by applying a closing force to the flap arrangement when the flap plate is in contact with a flap seat in the turbine housing, relative movement of the entire flap plate relative to the spindle is made possible to compensate for thermal deformation of the turbine housing, exhaust deposits and/or wear. It was found that by combining a flap plate with a flexible area and an at least partially flexible lever arm, on the one hand, a very good sealing effect can be achieved and, on the other hand, the stresses in the flap arrangement, especially in the lever arm, can be reduced. Lower stresses increase component failure safety and the service life of the flap arrangement.

In embodiments with a flexible lever arm, only one or several portions of the lever arm can be flexibly configured. The flexible portion(s) may have a reduced cross-sectional area compared to the rest of the lever arm.

In embodiments that can be combined with any of the previously described embodiments with a flexible lever arm, the lever arm can be designed and arranged in relation to the spindle and the flap plate in such a way that the elastic portion is substantially subjected to pressure by the closing force if no thermal deformations or wear of the turbine housing occur or deposits are present. Such an arrangement and design of the flexible portion has the advantage that the desired effect of the flexible portion, namely the compensation of thermal deformations, deposits or wear, actually only occurs if thermal deformations or wear occur and/or the valve disc no longer rests completely flat on the flap seat for other reasons, such as deposits. If there are no thermal deformations, no wear or deposits, i.e. if the valve disc lies completely flat on the flap seat, then the flexible portion is loaded exclusively with pressure so that there is virtually no relative movement between the valve disc and the spindle. If, due to thermal deformation, wear or other reasons, such as deposits, the valve disc no longer rests completely flat on the flap seat (leakage occurs), a moment is introduced into the flexible portion of the valve when the closing force is applied to the flap arrangement in the closed position of the flap arrangement. Due to the at least partial flexibility of the lever arm, the moment leads to a relative movement of the flap plate with respect to the spindle, whereby the flap plate comes to rest again completely flat on the flap seat. Together with the flexible portion of the flap plate, this results in a particularly good seal.

In embodiments that can be combined with any of the previously described embodiments with a flexible lever arm, the lever arm may have at least a first lever arm portion and a second lever arm portion, one end of the second lever arm portion being coupled to the flap plate. The flexible portion(s) may be located in the area of the second lever arm portion and/or the flexible portion(s) may be located in the area of the first lever arm section. In alternative embodiments, a predominant part of the lever arm, especially the entire lever arm, can be flexibly configured.

In embodiments that can be combined with any of the previously described embodiments with a flexible lever arm, the flexible portion(s) of the lever arm may have a lower bending stiffness than the rest of the lever arm and/or spindle.

In embodiments that can be combined with any of the previously described embodiments with a flexible lever arm, the flap plate and/or the lever arm can be dimensioned and have material properties so that an angle $\alpha$ of up to 30 can be compensated if a torque in the range from 0.8 to 20 Nm, preferably in the range from 1.5 to 15 Nm, in particular in the range from 2 to 10 Nm, is introduced into the spindle. The angle $\alpha$ is defined as the angle between the plane of the damper seat and the plane of an underside of the flap plate.

In embodiments that can be combined with any of the previously described flexible lever arm embodiments, the damper plate and/or lever arm can be dimensioned and have material properties that allow a damper plate offset of between 0.10 mm and 0.80 mm, in particular between 0.24 mm and 0.4 mm, when a pressure of between 125 MPa and 350 MPa is applied to the lever arm. In particular, the damper plate and/or lever arm may be dimensioned and have material properties such that an offset of the damper plate of between 0.32 mm and 0.36 mm is possible when a pressure of between 150 MPa and 200 MPa is applied to the lever arm; an offset of the flap plate of between 0.32 mm and 0.34 mm is allowed when a pressure of between 200 MPa and 250 MPa is applied to the lever arm; an offset of the flap plate of between 0.32 mm and 0.34 mm is allowed when a pressure of between 300 MPa and 350 MPa is applied to the lever arm; an offset of the flap plate of between 0.28 mm and 0.32 mm is allowed when a pressure of between 300 MPa and 350 MPa is applied to the lever arm; an offset of the flap plate of between 0.38 mm and 0.40 mm is allowed when a pressure of between 250 MPa and 300 MPa is applied to the lever arm; and an offset of the flap plate of between 0.26 mm and 0.28 mm is allowed when a pressure of between 125 MPa and 175 MPa is applied to the lever arm.

In embodiments that can be combined with any of the previously described embodiments, the spindle and the lever arm can be designed in one piece, or the lever arm and the flap plate can be designed in one piece, or the spindle, the lever arm and the flap plate can be designed in one piece.

In embodiments that can be combined with any of the previously described embodiments, the flap plate can be permanently connected to the lever arm. In particular, the lever arm may be welded to the flap plate.

In embodiments that can be combined with any of the previously described embodiments, the flap plate can have a spherical recess on its upper side in which a spherical end of the lever arm can be arranged.

In embodiments that can be combined with any of the previously described embodiments, the flap plate, lever arm and/or spindle can be manufactured as MIM parts.

The invention also includes a turbine for an exhaust-gas turbocharger with a turbine housing and a wastegate valve capable of passing exhaust-gas past a turbine wheel of the turbine. The wastegate valve comprises a flap arrangement according to any of the embodiments described above.

In turbine embodiments, the turbine housing may have a bushing bore in which a bushing is located, the spindle of the damper assembly being rotatably mounted in the bushing.

The invention also includes an exhaust-gas turbocharger with a turbine of any of the embodiments described above.

Further details and features of the invention are described below using the figures.

BRIEF DESCRIPTION OF THE FIGURES

FIG. 4a shows an isometric view in the partial section of a flap plate of a second exemplary embodiment of a flap arrangement according to the invention;

FIG. 4b shows a cross-sectional view of the flap plate of FIG. 4a;

FIG. 4c shows a cross-sectional view of a flap plate of a third exemplary embodiment of a flap arrangement according to the invention;

DETAILED DESCRIPTION

In the following, the figures are used to describe exemplary embodiments of the inventive flap arrangement 10 as well as a turbine 2 having such a flap arrangement 10 and a corresponding exhaust-gas turbocharger 1.

Figure 1:
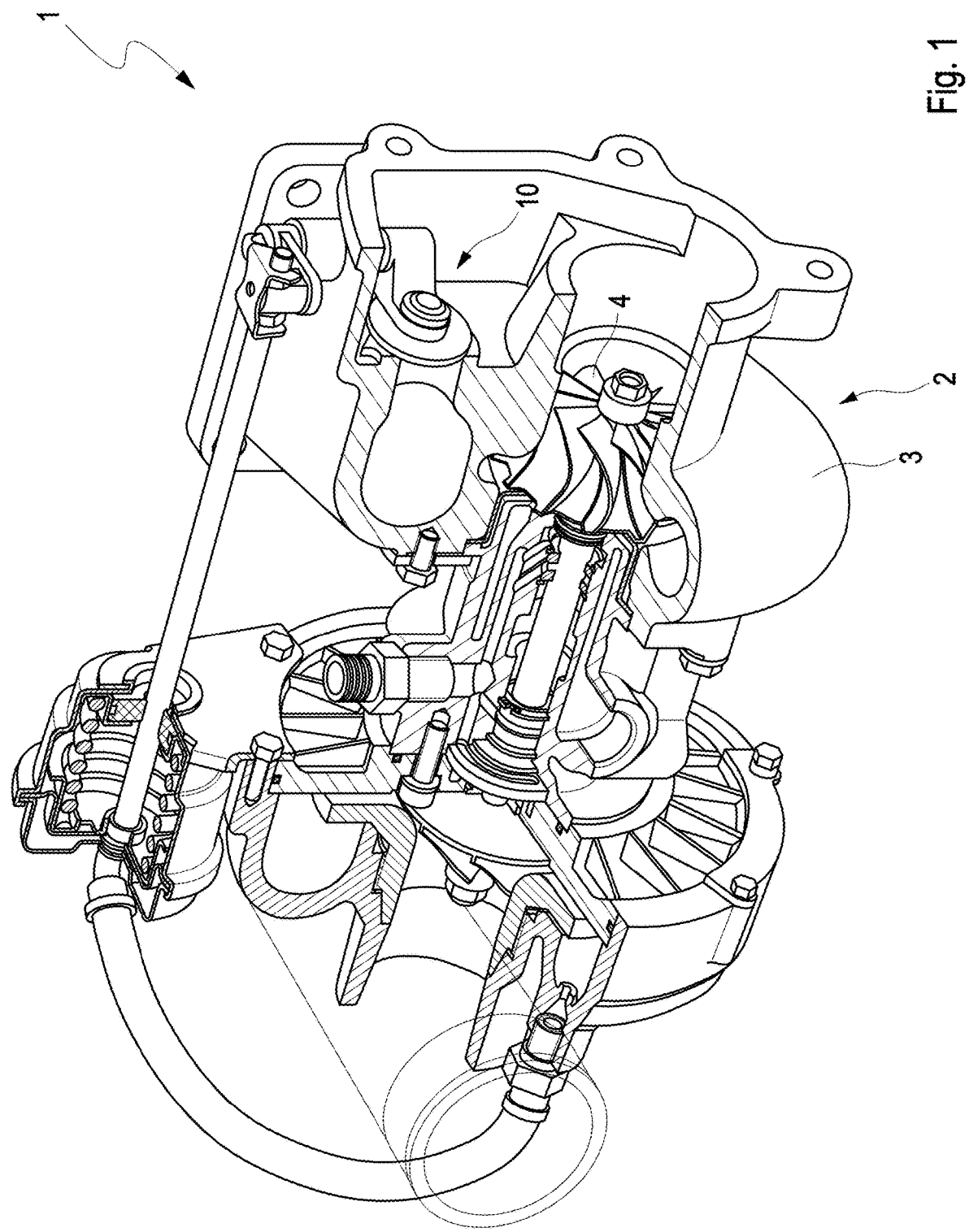
FIG. 1 shows an isometric view in the partial section of an exemplary embodiment of an inventive turbocharger.

FIG. 1 shows an exhaust-gas turbocharger 1, which can be equipped with the following embodiments of the flap arrangement 10 according to the invention. The exhaust-gas turbocharger 1 comprises a turbine 2 with a turbine housing 3 and a wastegate valve, which is suitable to lead exhaust-gas past the turbine wheel 4 of the turbine 2. The wastegate valve comprises a flap arrangement according to the invention 10. The turbine housing 3 also has a bushing bore in which a bushing can be arranged, wherein the flap arrangement 10 is then rotatably mounted in the bushing.

Figure 2:
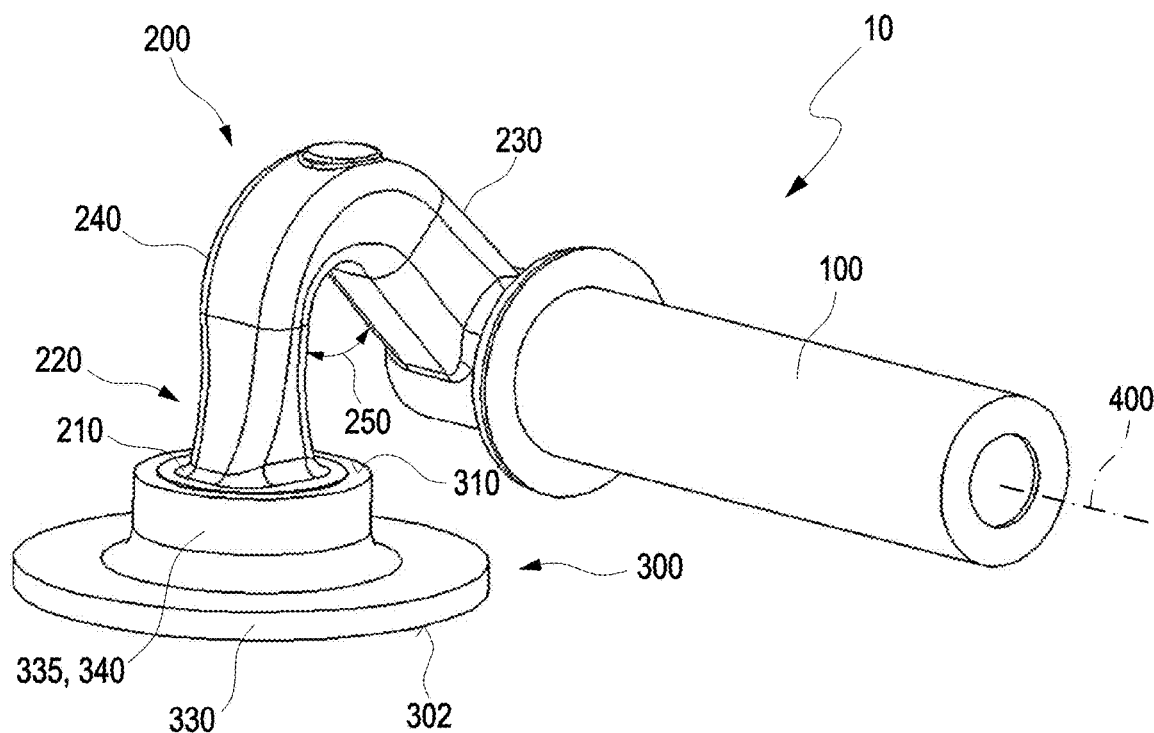
FIG. 2 shows an isometric view of a first exemplary embodiment of an inventive flap arrangement.

Referring to FIGS. 2 to 6, the following describes the inventive flap arrangement 10. As shown in FIG. 2 in particular, the flap arrangement 10 comprises a spindle 100 for rotatable mounting of the flap arrangement 10 in the turbine housing 3 and a lever arm 200. The spindle 100 defines the axis of rotation 400. The lever arm 200 is coupled to the spindle 100. In addition, the flap arrangement includes a flap plate 300, the flap plate 300 being coupled to the lever arm 200. According to the invention, the flap plate 300 has a flexible portion 330 in a radially outer area of the flap plate 300. The flexible portion 330 of the flap plate 300 results in elastic and/or plastic deformation of the flexible portion 330 of the flap plate 300 due to the application of a closing force to the flap arrangement 10 when the flap plate 300 is in contact with a flap seat 500 (see FIG. 6) in the turbine housing 3, in order to compensate for thermal deformation of the turbine housing 3, exhaust deposits and/or wear.

During elastic and/or plastic deformation, the flexible portion 330 of the valve disc 300 is deformed to adapt to a deformed or slightly displaced flap seat 500. Compared to its original shape and position, the flap seat 500 can change elastically and plastically due to thermal loads, for example. In addition, the shape of the flap seat 500 may change due to wear and exhaust-gas deposits. The flexible design of a portion 330 of the disc 300 allows it to adapt to the changed shape/position of the disc seat 500 when force is applied to it, wherein the force applied to overcome a gap caused by thermal deformation of the turbine housing, exhaust deposits and/or wear can be advantageously minimized relative to known rigid disc arrangements. In addition, the inventive flap arrangement 10 leads to an improved seat of the flap plate 300 on the flap seat 500 and consequently to a better sealing of a wastegate channel which the flap arrangement 10 is intended to close. Furthermore, sticking of the flap plate 300 in the flap seat 500, which can occur due to deformation of the flap seat 500, is better avoided.

As shown in FIGS. 2 to 4c, the flap plate 300 also has a rigid part 335, wherein the flexible part 330 surrounds the rigid part 335. The rigid part 335 has or corresponds in its radial extension to a receiving area 340 (see FIG. 2) in which the lever arm 200 is coupled with the flap plate 300.

As shown in FIGS. 2 to 4c, the flap plate 300 can be circular. Alternatively, the flap plate can also be oval. The flexible portion 330 is designed as a ring-shaped area 330. However, the flap plate 300 is not limited to any special shape and can have any geometrically meaningful shape that is adapted to the corresponding application. As shown, the flap plate can be circular or oval, for example. In these cases, the flexible area 330 can also be round or oval. An alternative form of the flap plate 300 is shown for example in FIG. 5b.

Referring to FIGS. 4a to 5b, the flap plate 300 has an underside 302, wherein the underside 302 is the side of the flap plate 300 that points in the direction of the flap seat 500. The underside 302 defines an underside surface $U_A$. The underside surface $U_A$ can be divided into a first partial surface $T_F$, which is assigned to the flexible part 330, and a second partial surface $T_S$, which is assigned to the rigid part 335 (see e.g. FIGS. 5a and 5b). The first partial area $T_F$ may be greater than or equal to 0.2 times the underside area $U_A$, in particular greater than or equal to 0.4 times the underside area $U_A$, particularly preferably greater than or equal to 0.5 times the underside area $U_A$. In other words, the second partial surface $T_S$ corresponds to a projection of the rigid part 335 of the flap plate 300 onto the underside surface $U_A$ of the flap plate 300. The first partial surface $T_F$ then corresponds to the remaining underside surface $U_A$, i.e. the underside surface $U_A$ minus the second partial surface $T_S$. $T_F$ can be $\geq 0.2*U_A$, especially $T_F$ can be $\geq 0.4*U_A$, especially preferred $T_F$ can be $\geq 0.5*U_A$. Formulated in a different way again, the following ratio of the second partial area $T_S$ to the underside area $U_A$ can be specified: $0.01 \leq T_S/U_A \leq 0.8$, preferably $0.1 \leq T_S/U_A \leq 0.6$, especially preferred $0.2 \leq T_S/U_A \leq 0.5$.

Figure 3:
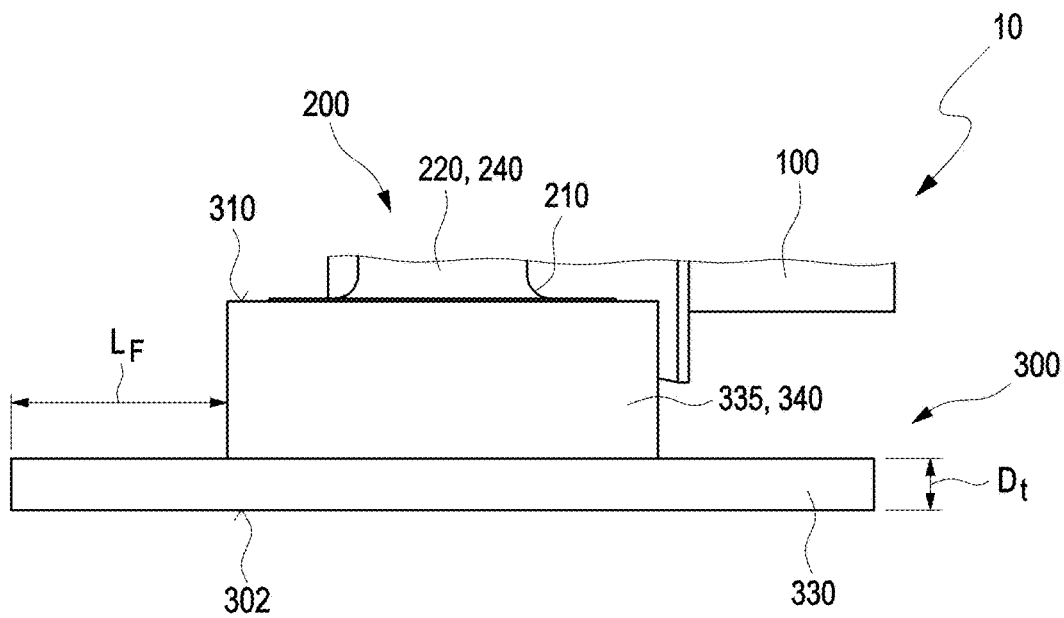
FIG. 3 shows an enlarged side view of a flap plate of the exemplary embodiment of FIG. 2.
Figure 4:
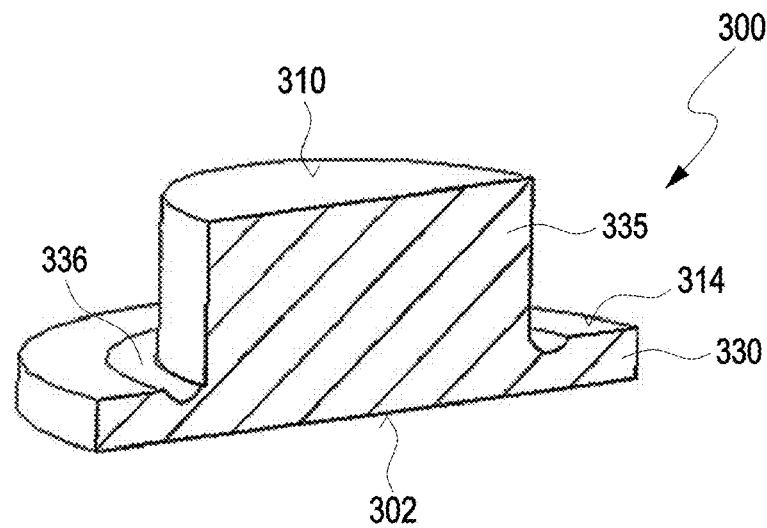
Figure 4:
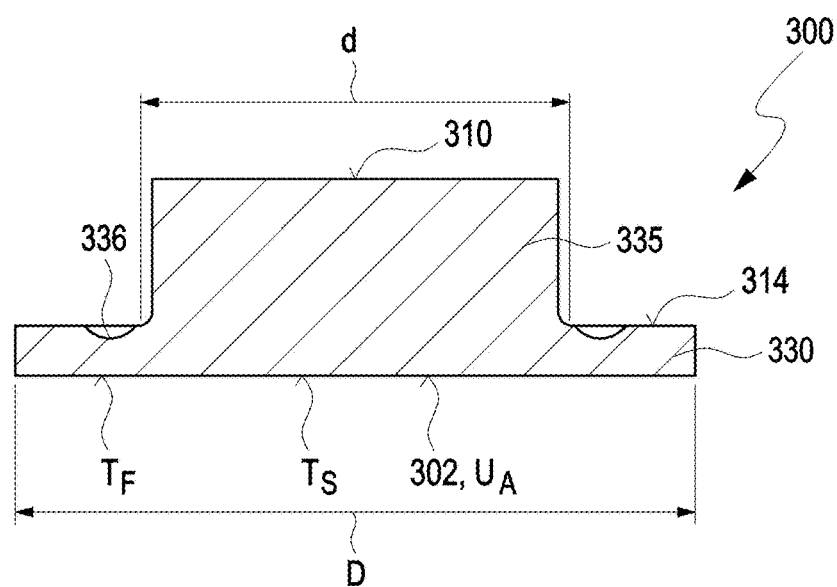
Figure 4:
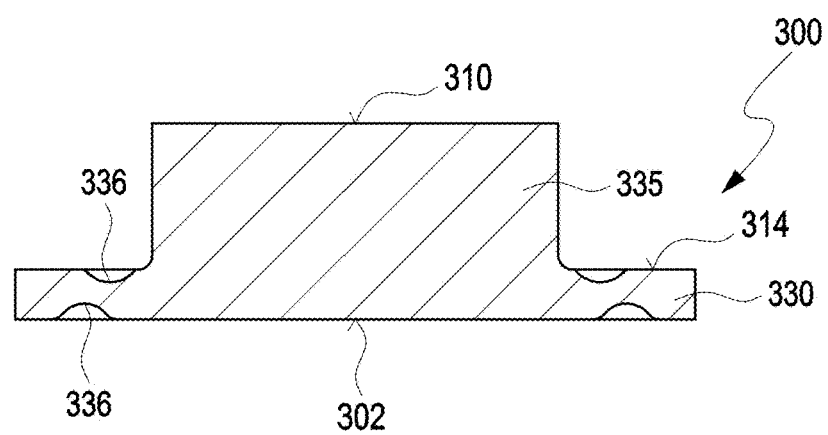
Figure 5:
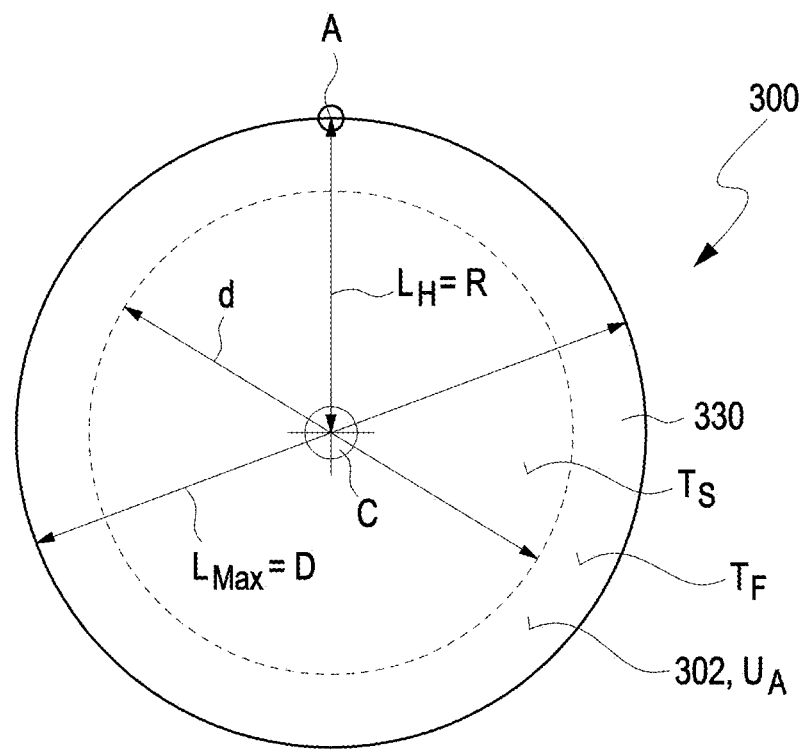
FIG. 5a shows a view of a damper plate of a fourth exemplary embodiment of a flap arrangement according to the invention.
FIG. 5b shows a view of a flap plate of a fifth exemplary embodiment of a flap arrangement according to the invention.
Figure 5:
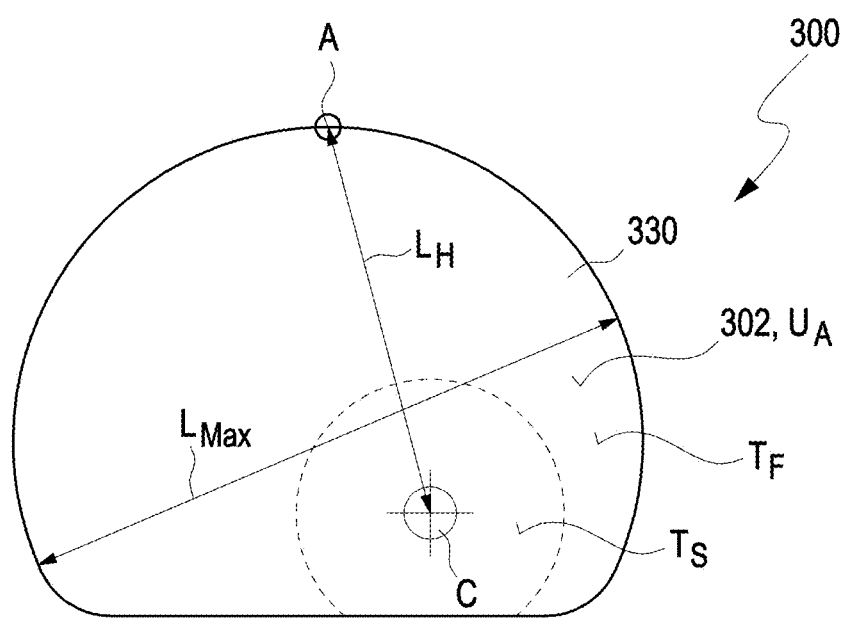
Figure 6:
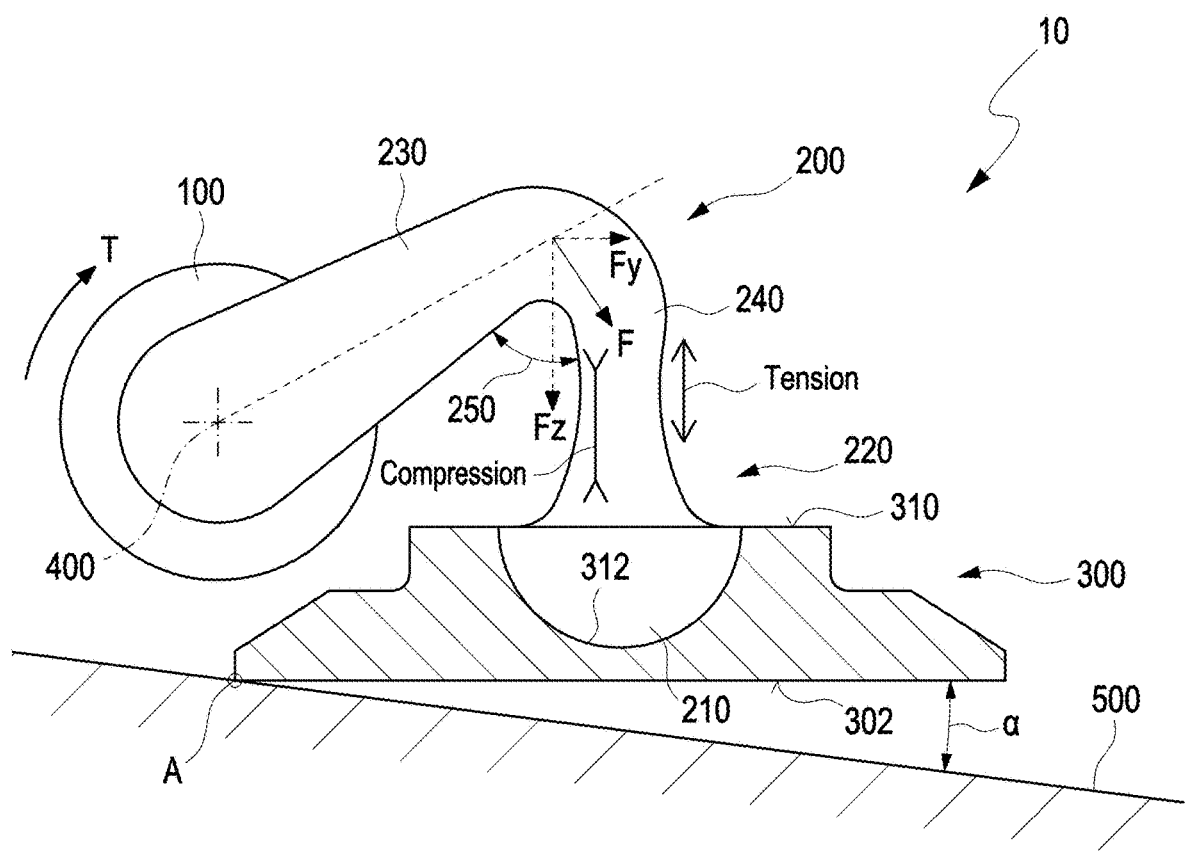
FIG. 6 shows a side view of a sixth exemplary embodiment of a flap arrangement according to the invention.

With reference to FIGS. 3, 5a/b and 6, it is shown that the flap plate 300 has a contact point A on the edge of the flap plate 300 which, when installed, first comes into contact with the flap seat 500 when the flap arrangement 10 is closed (see FIG. 6). With reference to FIGS. 5a and 5b, a lever length $L_H$ for the flap plate 300 can be defined via the contact point A as the distance between the contact point A and a geometric center of gravity C of the second partial surface $T_S$. In addition, a maximum length $L_{Max}$ for the disc 300 can be defined as the maximum distance between two opposite points on the edge of the disc 300.

FIGS. 4a and 5a show an example in which the flap plate 300 is circular with diameter D and the rigid part 335 is circular with diameter d. The flap plate 300 is circular with diameter D and the rigid part 335 is circular with diameter d. The resulting circular second partial surface $T_S$ is arranged centrally (and concentrically) in the underside surface $U_A$, which corresponds to a central arrangement of the lever arm 200 on the flap plate 300. With such a design the lever length $L_H$ is equal to the radius R of the flap plate 300 (see FIG. 5a). With regard to the lever length $L_{MAX}$, the circular example shows that the lever length $L_M$ corresponds to the diameter D of the flap plate 300. FIG. 5b shows an alternative embodiment.

For all embodiments, the following can apply in particular to the ratio of $L_H$ to $L_{Max}$:

$0.20 \leq L_H/L_{Max} \leq 0.95$; in particular $0.40 \leq L_H/L_{Max} \leq 0.90$.

With additional reference to FIG. 3, a flex length $L_F$ for the flap plate 300 can also be defined as the distance between the contact point A and an outer edge of the second partial surface $T_S$. In particular, the following can apply to a ratio of $L_F/L_H$:

$0.20 \leq L_F/L_H \leq 0.95$, in particular $0.40 \leq L_F/L_H \leq 0.90$.

The flap plate 300 has a thickness $D_t$ in the area of an outer edge of the flexible part 330 (see FIG. 3). The entire part portion 330 of the flap plate 300 can have a constant thickness corresponding to the thickness $D_t$, see also FIG. 3. Alternatively, the flexible part 330 of the flap plate 300 can have different thicknesses, especially when viewed in the radial direction from the outer edge towards the rigid part 335. The thickness of the flexible part 330 can increase in the radial direction towards the rigid part 335. Alternatively, the thickness of the flexible part 330 may decrease in the radial direction towards the rigid part 335. For example, the thickness of the flexible part 330 can increase (at least in sections) up to a thickness of at least $1.1*D_t$. Alternatively, the thickness of the flexible part 330 may decrease (at least in sections) to a thickness of $0.9*D_t$ or less before increasing again in the transition area to the rigid part 335. The boundary between flexible part 330 and rigid part 335 or the transition from flexible part 330 to rigid part 335 of the disc 300 can be defined as the area where the disc 300 has a thickness greater than approximately $1,2*D_t$. In other words, the flexible part 330 has a thickness less than $1,2*D_t$. For an example, the flexible region 330 can be characterized by a thickness of less than or equal to 8 mm. In particular, the flexible region 330 can have a thickness in the range of from 1 mm to 8 mm, in particular 1 mm to 5 mm, preferably 1 mm to 4 mm.

As shown in FIGS. 4a to 4c, at least one recess 336 can be provided on an underside 302 and/or on an upper side 314 of the flexible part 330 of the flap plate 300. The recess(es) 336 allows the flexibility in the flexible part 330 to be specifically adapted or increased. The at least one recess 336 may be in the form of at least one groove arranged in the circumferential direction. In particular, the groove may be a closed groove along the circumferential direction or extend over at least part of the circumference. For example, one or more grooves can be divided into segments or several grooves can be radially offset, which extend over the entire circumference or only portions/segments of the circumference.

In the following, particular reference is made to FIGS. 2 and 6. In addition (or alternatively) to the flap plate 300 with flexible part 330, a part of the lever arm 200 of the flap arrangement 10 can also be flexibly configured such that, by applying a closing force to the flap arrangement 10, when the flap plate 300 is in contact with the flap seat 500 in the turbine housing 3, a relative movement of the entire flap plate 300 relative to the spindle 100 is made possible. This in turn means that thermal deformations of the turbine housing 3, exhaust deposits and/or wear can be compensated for. Due to the design of the flap arrangement 10 with a flexible lever arm 200, the lever arm 200 is slightly elastically and/or plastically deformed, e.g. bent, when the corresponding force is applied to the flap arrangement 10 when it is closed. In particular, the differences between the thermal deformations of the flap seat 500 occurring during turbocharger operation can thus be compensated even better. This in turn leads to an improved seat of the flap plate 300 on the flap seat 500 and consequently to a better sealing of the wastegate channel. The same applies to the compensation of (uneven) wear and/or exhaust deposits which can lead to leakage. Better sealing means less leakage, which in turn reduces the closing force to be applied to flap arrangement 10 compared to known rigid flap arrangements. In addition, the risk of sticking the flap arrangement 10 is also reduced.

In addition, it was found that a combination of a flap plate 300 with a flexible region 330 and an at least partially flexible lever arm 200 can reduce the stresses in the flap arrangement 10, especially in the lever arm 200. Lower stresses increase component failure safety and the service life of the flap arrangement 10.

Depending on the design of the flap arrangement, one or more portions 220 of the lever arm 200 can be flexibly configured. For example, the flexible portion or portions 220 may have a reduced cross-sectional area compared to the rest of the lever arm 200. In particular, the lever arm 300 can be designed and arranged with respect to the spindle 100 and the flap plate 300 in such a way that the flexible portion or portions 220 are substantially subjected to pressure by the closing force if no thermal deformation or wear of the turbine housing 3 occurs or if deposits are present. Such an arrangement and design of the flexible portion(s) 220 has the advantage that the desired effect of the flexible portion(s) 220, namely the compensation of thermal deformations, actually only occurs if thermal deformations or wear occur and/or the flap plate 300 no longer rests completely flat on the flap seat 500 for other reasons, such as deposits. If there are no thermal deformations or wear or deposits, i.e. if the flap plate 300 lies completely flat on the flap seat 500, then the flexible portion or portions 220 are exclusively loaded with pressure, so that there is virtually no relative movement between the flap plate 300 and the spindle 100. If, due to thermal deformation, wear or other reasons, such as deposits, the valve disc 300 no longer rests completely flat on the flap seat 500 (leakage occurs), then a moment is applied to the flexible portion(s) 220 when the closing force is applied to the flap arrangement 10 in the closed position of the flap arrangement 10. Due to the at least partial flexibility of the lever arm 200, the moment leads to a relative movement of the flap plate 300 relative to the spindle, whereby the flap plate 300 comes to rest again completely flat on the flap seat 500. This results in a particularly good seal.

FIGS. 2 and 6 show that the lever arm 200 may have at least one first lever arm portion 230 and a second lever arm portion 240, one end 210 of the second lever arm portion 240 being coupled to the flap plate 300. For example, the first lever arm portion 230 and the second lever arm portion 240 can include an angle 250 between 20° and 80°, in particular between 30° and 70°, preferably between 40° and 60°. In the example shown in FIG. 2, the second lever arm portion 240 extends substantially orthogonally from the top 310 of the flap plate 300. The flexible portion or portions 220 can be arranged in the area of the second lever arm portion 240. Alternatively or additionally, the flexible portions 220 can be arranged in the area of the first lever arm portion 230. In alternative embodiments, a predominant part of the lever arm 200, in particular the entire lever arm 200, can be flexibly configured.

To achieve flexibility in the lever arm 200, the flexible portion(s) 220 of the lever arm 200 may have a lower bending stiffness than the rest of the lever arm 200 and/or spindle 100.

Referring to FIG. 6, an example is shown in which thermal deformation, wear and/or exhaust deposits lead to the flap plate 300 not lying flat on the flap seat 500. The contact point A is already in contact with the flap seat 500, but there remains an oblique position of the flap plate 300 and thus a gap between the flap plate 300 and the flap seat 500. FIG. 6 illustrates how forces and tensions in such a case act on the flexible portion 220 of the lever arm 200, causing a corresponding adjustment of the position of the flap plate 300 and thus enabling the entire flap plate 300 to rest on the flap seat 500. The closing force F, which results from a moment T due to the rotation of the spindle 100, acts on the lever arm 200 with the flexible portion 220. The force has the vector components $F_Z$ and $F_Y$. When the force F acts on the flexible portion 220 of the lever arm 200, compressive stress ("Compression") and tensile stress ("Tension") result in the shown areas of the flexible portion 220. Due to these tensile and compressive stresses, the lever arm 200 can deform in its flexible portion 220 in such a way that the misalignment of the flap plate 300 with respect to the flap seat 500 can be compensated, so that the flap plate 300 rests again (almost) completely on the flap seat 500 and the desired sealing effect is achieved.

Also to be seen in FIG. 6 is an angle α, which is defined as the angle between the plane of the flap seat 500 and the plane of the underside 302 of the flap plate 300. In the new state of the flap arrangement 10 in the installed state, the angle α is approximately 00°, since the flap plate 300 in the closed state lies substantially flat on the flap seat 500. If thermal deformation, exhaust deposits or wear occur, the position and/or shape of the 500 flap seat changes slightly. In the closed position of the flap arrangement 10, without exerting any pressure on the flap plate 300, the planes in which the flap seat 500 and the flap plate 300 are arranged in each case no longer coincide, so that an angle α greater than 0° is created between the two planes and consequently the flap plate 300 no longer rests in a sealing manner on the flap seat 500.

In some embodiments, the flap plate 300 alone or the lever arm 200 alone or the combination of flap plate 300 and lever arm 200 can now be dimensioned/shaped and have such material properties that an angle α of up to 30 can be compensated if a torque in the range from 0.8 to 20 Nm, preferably in the range from 1.5 to 15 Nm, in particular in the range from 2 to 10 Nm, is introduced into the spindle 100. This means that the flexible design of the flap plate 300 and/or the lever arm 200 can compensate for this angle α, so that better sealing of the wastegate channel is achieved.

The deformation(s) or displacement(s) of the flexible portion 330 of the flap plate 300 and/or of the flexible portion(s) 220 of the lever arm 200 can be both plastic and elastic. Since the displacement or modification of the damper seat 500 can also be plastic due to thermal influences and/or wear, a plastic modification of the flap plate 300 and/or the lever arm 200 can be particularly advantageous, as this can lead to a permanently better seal.

The flexibility of the flap plate 300, the lever arm 200 and/or the combination of flap plate 300 and lever arm 200 can also be defined as follows. The valve disc 300 and/or the lever arm 200 may be dimensioned and have material properties such that an offset of the valve disc 300 of between 0.10 mm and 0.80 mm, in particular between 0.24 mm and 0.4 mm, is possible when a pressure of between 125 MPa and 350 MPa is applied to the lever arm 200. In particular, the valve disc 300 and/or the lever arm 200 may be dimensioned and have material properties such that an offset of the valve disc 300 of between 0.32 mm and 0.36 mm is possible when a pressure of between 150 MPa and 200 MPa is applied to the lever arm 200; an offset of the valve disc 300 of between 0.32 mm and 0.34 mm is allowed when a pressure of between 200 MPa and 250 MPa is applied to the lever arm 200; an offset of the valve disc 300 of between 0.32 mm and 0.34 mm is allowed when a pressure of between 300 MPa and 350 MPa is applied to the lever arm 200; an offset of the flap plate 300 of between 0.28 mm and 0.32 mm is allowed when a pressure of between 300 MPa and 350 MPa is applied to the lever arm 200; an offset of the flap plate 300 of between 0.38 mm and 0.40 mm is allowed when a pressure of between 250 MPa and 300 MPa is applied to the lever arm 200; and an offset of the flap plate 300 of between 0.26 mm and 0.28 mm is allowed when a pressure of between 125 MPa and 175 MPa is applied to the lever arm 200 when a pressure of between 125 MPa and 175 MPa is applied to the lever arm 200; and an offset of the flap plate 300 of between 0.26 mm and 0.28 mm is allowed when a pressure of between 0.26 mm and 175 MPa is applied to the lever arm 200.

In addition to the partially flexible flap plate 300 and/or (partially) flexible lever arm 200, the spindle 100 can also be equipped with a certain flexibility. For example, a middle portion of the spindle 100 can be more flexible than the two edge areas of the spindle 100 (seen in axial direction). This can be achieved, for example, by reducing the spindle diameter in the middle portion of the spindle 100. Such a measure can further improve the sealing effect of the flap arrangement 10.

A flexible flap arrangement 10 was described above, wherein portions 220 of the lever arm 200 or the entire lever arm 200 can be flexibly configured, portions 330 of the flap plate 300 can be flexibly configured and/or portions of the spindle 100 can be flexibly configured. The desired flexibility of flap arrangement 10 can be achieved by one or more of the measures described above. This can be described as a flexible flap arrangement 10 (if spindle 100, lever arm 200 and flap plate 300 interact) in the sense of the invention, if elastic and/or plastic deformation (including creep strain) is achieved, with a system stiffness of the flap arrangement 10 of max. 2500 N/mm and an average material temperature of approx. 850° C. System stiffness refers to the system consisting of spindle 100, lever arm 200 and flap plate 300, which are firmly or rigidly connected to each other or designed as one piece. The stiffness is defined as F/ΔL. F is the force applied in a test setup to determine the system stiffness at the outer edge of the flap plate 300, at the point of contact A. The force is the force applied to the outer edge of the flap plate 300, at the point of contact A, to determine the system stiffness. The force is applied perpendicular to the underside surface $U_A$ when the spindle 100 is fixed in a fixed position. ΔL is the (plastic and/or elastic) deformation of the system caused by the force on the disc 300.

The spindle 100 and the lever arm 200 can be designed in one piece. One-piece means that the spindle 100 and the lever arm 200 are manufactured as a single (integral) component (for example as a cast part). The same applies alternatively to the lever arm 200 and the flap plate 300, which can also be designed in one piece. As a further alternative, the spindle 100, the lever arm 200 and the flap plate 300 can also be designed in one piece. This means that a single component integrally comprises the spindle 100, the lever arm 200 and the flap plate 300.

In all embodiments, the flap plate 300 is fixedly connected to the lever arm 200. In particular, the lever arm 200 can be welded to the flap plate 300. For example, the flap plate 300 may have a spherical recess 312 on its upper side 310, in which a spherical end 210 of the lever arm 200 can be arranged (see FIG. 6). Such a design facilitates the assembly of flap arrangement 10 and the aligned coupling of lever arm 200 and damper plate 300 by means of a welded joint.

The flap plate 300, the lever arm 200 and/or the spindle 100 can be manufactured as Metal Injection Molding (MIM) parts. The spindle 100, the lever arm 200 and the flap plate 300 can each be designed as independent MIM parts, which are then connected to each other accordingly. Alternatively, spindle 100 and lever arm 200, lever arm 200 and flap plate 300 or spindle 100, lever arm 200 and flap plate 300 can be manufactured as an integral MIM part.

Independent of the production of the unit made of spindle 100, lever arm 200 and flap plate 300, this means that the lever arm 200 and the flap plate 300 are rigidly connected to each other in their connection region. In other words, there is virtually no relative movement possible between the lever arm 200 and the flap plate 300 due to deformation or the like in this connection region, which is located in the region of the rigid portion 335.

As already described at the beginning, the invention also includes a turbine 2 for an exhaust-gas turbocharger 1 with a turbine housing 3 and a wastegate valve, which is suitable for passing exhaust-gas past a turbine wheel 4 of turbine 2. The wastegate valve comprises a flap arrangement 10 according to any of the above design examples.

The invention also includes an exhaust-gas turbocharger 1 with such a turbine 2.

Although the present invention has been described above and is defined in the attached claims, it should be understood that the invention may alternatively also be defined according to the following embodiments:

1. A flap arrangement (10) for a turbine (2) of an exhaust-gas turbocharger (1), in particular for a waste-gate valve of the turbine (2), having a spindle (100) for rotatably mounting the flap arrangement (10) in a turbine housing (3); a lever arm (200), the lever arm (200) being coupled to the spindle (100); and a flap plate (300), the flap plate (300) being coupled to the lever arm (200); characterized in that the flap plate (300) has a flexible part (330) in a radially outer region of the flap plate (300) such that by applying a closing force to the flap arrangement (10) when the flap plate (300) is in contact with a flap seat (500) in the turbine housing (3), elastic and/or plastic deformation of the flexible part (330) of the flap plate (300) can be caused to compensate for thermal deformations of the turbine housing (3), exhaust-gas deposits and/or wear.

2. A flap arrangement according to embodiment 1, characterized in that the flap plate (300) further comprises a rigid part (335), the flexible part (330) surrounding the rigid part (335).

3. A flap arrangement according to embodiment 1 or embodiment 2, characterized in that the flap part (300) is circular or oval and the flexible part (330) is an annular region (330).

4. A flap arrangement according to embodiment 2 or embodiment 3, characterized in that the flap plate (300) has an underside (302), wherein the underside (302) has an underside surface ($U_A$), and wherein the underside surface ($U_A$) comprises a first partial surface ($T_F$) associated with the flexible part (330) and a second partial surface ($T_S$) associated with the rigid part (335).

5. A flap arrangement according to embodiment 4, characterized in that the first partial surface ($T_F$) is greater than or equal to 0.2 times the underside surface ($U_A$), in particular greater than or equal to 0.4 times the underside surface ($U_A$), is particularly preferably greater than or equal to 0.5 times the underside surface ($U_A$).

6. A flap arrangement according to embodiment 4 or embodiment 5, characterized in that the flap plate (300) has a contact point (A) on the edge of the flap plate (300) which, in the installed state during the closing operation of the flap arrangement (10), comes into contact first with the flap seat (500), a lever length ($L_H$) being defined as the distance between the contact point (A) and a geometric center of gravity (C) of the second partial surface ($T_S$), and a maximum length ($L_{Max}$) is defined as the maximum distance between two opposing points on the edge of the disc (300).

7. A flap arrangement according to embodiment 6, characterized in that the following applies to the ratio of $L_H$ to $L_{Max}$:

$0.20 \leq L_H/L_{Max} \leq 0.95$, in particular $0.40 \leq L_H/L_{Max} \leq 0.90$.

8. A flap arrangement according to embodiment 6 or embodiment 7, characterized in that a flex length ($L_F$) is defined as the distance between the point of contact (A) and an outer edge of the second partial surface ($T_S$), wherein the following applies to a ratio of $L_F/L_H$ applies:

$0.20 \leq L_F/L_H \leq 0.95$, in particular $0.40 \leq L_F/L_H \leq 0.90$.

9. A flap arrangement according to any of the preceding embodiments, characterized in that the flap plate (300) has a thickness ($D_t$) in the region of an outer edge of the flexible portion (330).

10. A flap arrangement according to embodiment 9, characterized in that the entire flexible portion (330) of the flap plate (300) has a constant thickness corresponding to the thickness ($D_t$).

11. A flap arrangement according to embodiment 9, characterized in that the flexible part (330) of the flap plate (300) has different thicknesses, in particular seen in the radial direction from the outer edge towards the rigid part (335).

12. A flap arrangement according to embodiment 11, characterized in that the thickness of the flexible part (330) increases in the radial direction towards the rigid part (335); or characterized in that the thickness of the flexible part (330) decreases in the radial direction towards the rigid part (335).

13. A flap arrangement according to any of the preceding embodiments, characterized in that at least one recess (336) is provided on an underside (302) and/or an upper side (314) of the flexible part (330).

14. A flap arrangement according to embodiment 13, characterized in that the at least one recess (336) is designed in the form of at least one groove arranged in the peripheral direction, in particular the groove being a closed groove along the peripheral direction or extending over at least a partial region.

15. A flap arrangement according to any of the preceding embodiments, characterized in that at least one portion of the lever arm (200) is flexibly configured such that by applying a closing force to the flap arrangement (10) when the flap plate (300) is in contact with a flap seat (500) in the turbine housing (3), relative movement of the entire flap plate (300) relative to the spindle (100) is enabled to compensate for thermal deformations of the turbine housing (3), exhaust deposits and/or wear.

16. A flap arrangement according to embodiment 15, characterized in that only one or several portions (220) of the lever arm (200) are flexibly configured.

17. A flap arrangement according to embodiment 16, characterized in that the flexible portion (220) has a reduced cross-sectional area in comparison to the rest of the lever arm (200).

18. A flap arrangement in accordance with embodiment 16 or embodiment 17, characterized in that the lever arm (200) is designed and arranged with respect to the spindle (100) and the flap plate (300) in such a way that the flexible portion (220) is substantially pressurized by the closing force if no thermal deformations or wear of the turbine housing (3) occur or if no exhaust-gas deposits are present.

19. A flap arrangement according to any one of embodiments 16 to 18, characterized in that the lever arm (200) comprises at least one first lever arm portion (230) and a second lever arm portion (240), one end (210) of the second lever arm portion (240) being coupled to the flap plate (300).

20. A flap arrangement according to embodiment 19, characterized in that the flexible portion or portions (220) are arranged in the region of the second lever arm portion (240), and/or in that the flexible portion or portions (220) are arranged in the region of the first lever arm portion (230).

21. A flap arrangement according to embodiment 15, characterized in that a predominant part of the lever arm (200), in particular the entire lever arm (200), is of flexible design.

22. A flap arrangement according to any one of embodiments 15 to 21, characterized in that the flexible portion or portions (220) of the lever arm (200) have a lower bending stiffness than the rest of the lever arm (200) and/or the spindle (100).

23. A flap arrangement according to any of the preceding embodiments, having flap plates (300) and/or, if dependent on embodiment 15, having a lever arm (200) dimensioned and material properties such that an angle (a) of up to 30 can be compensated, when a torque in the range of from 0.8 to 20 Nm, preferably in the range of from 1.5 to 15 Nm, in particular in the range of from 2 to 10 Nm, is introduced into the spindle (100), wherein the angle (a) is defined as the angle between the plane of the flap seat (500) and the plane of an underside (302) of the flap plate (300).

24. A flap arrangement according to any of the preceding embodiments, characterized in that the flap plate (300) and/or, if dependent on embodiment 15, the lever arm (200) is/are dimensioned and has/have material properties such that an offset of the flap plate (300) of between 0.10 mm to 0.80 mm, in particular between 0.24 mm and 0.4 mm, is enabled when a pressure of between 125 MPa and 350 MPa is applied to the lever arm (200).

25. A flap arrangement in accordance with embodiment 24, characterized in that the flap plate (300) and/or, if dependent on embodiment 15, the lever arm (200) is/are dimensioned and has/have material properties such that an offset of the flap plate (300) of between 0.32 mm and 0.36 mm is made possible when a pressure of between 150 MPa and 200 MPa is applied to the lever arm (200); a displacement of the flap plate (300) of between 0.32 mm and 0.34 mm is possible if a pressure of between 200 MPa and 250 MPa is applied to the lever arm (200); an offset of the flap plate (300) of between 0.32 mm and 0.34 mm is enabled when a pressure of between 300 MPa and 350 MPa is applied to the lever arm (200); an offset of the flap plate (300) of between 0.28 mm and 0.32 mm is enabled when a pressure of between 300 MPa and 350 MPa is applied to the lever arm (200); an offset of the flap plate (300) of between 0.38 mm and 0.40 mm is enabled when a pressure of between 250 MPa and 300 MPa is applied to the lever arm (200); and an offset of the flap plate (300) of between 0.26 mm and 0.28 mm is enabled when a pressure of between 125 MPa and 175 MPa is applied to the lever arm (200).

26. A flap arrangement according to any one of the preceding embodiments, characterized in that the spindle (100) and the lever arm (200) are integrally formed, or the lever arm (200) and the flap plate (300) are integrally formed, or the spindle (100), the lever arm (200) and the flap plate (300) are integrally formed.

27. A flap arrangement according to any of the preceding embodiments, characterized in that the flap plate (300) is fixedly connected to the lever arm (200), in particular characterized in that the lever arm (200) is welded to the flap plate (300).

28. A flap arrangement according to any of the preceding embodiments, characterized in that the flap plate (300) has on its upper side (310) a spherical recess (312) in which a spherical end (210) of the lever arm (200) is arranged.

29. A flap arrangement according to any of the preceding embodiments, characterized in that the flap plate (300), the lever arm (200) and/or the spindle (100) are manufactured as MIM part.

30. A turbine (2) for an exhaust-gas turbocharger (1) with a turbine housing (3); and a wastegate valve suitable for routing exhaust-gas past a turbine wheel (4) of the turbine; characterized in that the wastegate valve comprises a flap arrangement (10) according to any of the preceding embodiments.

31. A turbine according to embodiment 30, characterized in that the turbine housing (3) has a bush bore in which a bush is arranged, the spindle (100) of the flap arrangement (10) being rotatably mounted in the bush.

32. An exhaust-gas turbocharger (1) fitted with a turbine (2) of embodiment 30 or 31.

The invention claimed is:

1. A flap arrangement (10) for a turbine (2) of an exhaust-gas turbocharger (1), in particular for a wastegate valve of the turbine (2), having a spindle (100) for rotatably mounting the flap arrangement (10) in a turbine housing (3);
a lever arm (200), the lever arm (200) being coupled to the spindle (100); and
a flap plate (300), the flap plate (300) being coupled to the lever arm (200);
characterized in that the flap plate (300) has a flexible part (330) in a radially outer region of the flap plate (300) such that by applying a closing force to the flap arrangement (10) when the flap plate (300) is in contact with a flap seat (500) in the turbine housing (3), elastic and/or plastic deformation of the flexible part (330) of the flap plate (300) can be caused to compensate for thermal deformations of the turbine housing (3), exhaust gas deposits and/or wear,
characterized in that the flap plate (300) further comprises a rigid part (335), the flexible part (330) surrounding the rigid part (335),
characterized in that the flap plate (300) has an underside (302), wherein the underside (302) has an underside surface ($U_A$), and wherein the underside surface ($U_A$) comprises a first partial surface ($T_F$) associated with the flexible part (330) and a second partial surface ($T_S$) associated with the rigid part (335), and
characterized in that the flap plate (300) has a contact point (A) on the edge of the flap plate (300) which, in the installed state, comes into contact first with the flap seat (500) during the closing operation of the flap arrangement (10), a lever length ($L_H$) being defined as the distance between the contact point (A) and a geometric center of gravity (C) of the second partial surface ($T_S$), and a maximum length ($L_{Max}$) is defined as the maximum distance between two opposing points on the edge of the flap plate (300); the following applies to the ratio of $L_H$ to $L_{Max}$:

$$0.20 \leq L_H/L_{Max} \leq 0.95.$$

2. A flap arrangement according to claim 1, characterized in that the first partial surface ($T_F$) is greater than or equal to 0.2 times the underside surface ($U_A$).

3. A flap arrangement according to claim 1, wherein the ratio of $L_H$ to $L_{Max}$ is $0.40 \leq L_H/L_{Max} \leq 0.90$.

4. A flap arrangement according to claim 1, characterized in that a flex length ($L_F$) is defined as the distance between the point of contact (A) and an outer edge of the second partial surface ($T_S$), wherein the following applies to a ratio of $L_F/L_H$:

$$0.20 \leq L_F/L_H \leq 0.95.$$

5. A flap arrangement according to claim 4, wherein the ratio of $L_F/L_H$ is $0.40 \leq L_F/L_H \leq 0.90$.

6. A flap arrangement according to claim 1, characterized in that at least one recess (336) is provided on an underside (302) and/or an upper side (314) of the flexible part (330).

7. A turbine (2) for an exhaust-gas turbocharger (1) with a turbine housing (3); and
a wastegate valve suitable for routing exhaust-gas past a turbine wheel (4) of the turbine;
characterized in that the wastegate valve comprises a flap assembly (10) according to claim 1.

8. An exhaust turbocharger (1) with a turbine (2) according to claim 7.

9. A flap arrangement (10) for a turbine (2) of an exhaust-gas turbocharger (1), in particular for a wastegate valve of the turbine (2), having a spindle (100) for rotatably mounting the flap arrangement (10) in a turbine housing (3);
a lever arm (200), the lever arm (200) being coupled to the spindle (100); and
a flap plate (300), the flap plate (300) being coupled to the lever arm (200);
characterized in that the flap plate (300) has a flexible part (330) in a radially outer region of the flap plate (300) such that by applying a closing force to the flap arrangement (10) when the flap plate (300) is in contact with a flap seat (500) in the turbine housing (3), elastic and/or plastic deformation of the flexible part (330) of the flap plate (300) can be caused to compensate for thermal deformations of the turbine housing (3), exhaust gas deposits and/or wear,
characterized in that at least one recess (336) is provided on an underside (302) and/or an upper side (314) of the flexible part (330).

10. A flap arrangement according to claim 9, characterized in that the flap plate (300) further comprises a rigid part (335), the flexible part (330) surrounding the rigid part (335).

11. A flap arrangement according to claim 10, characterized in that the flap plate (300) has an underside (302), wherein the underside (302) has an underside surface ($U_A$), and wherein the underside surface ($U_A$) comprises a first partial surface ($T_F$) associated with the flexible part (330) and a second partial surface ($T_S$) associated with the rigid part (335).

12. A turbine (2) for an exhaust-gas turbocharger (1) with a turbine housing (3); and
a wastegate valve suitable for routing exhaust-gas past a turbine wheel (4) of the turbine;
characterized in that the wastegate valve comprises a flap assembly (10) according to claim 9.

13. A flap arrangement (10) for a turbine (2) of an exhaust-gas turbocharger (1), in particular for a wastegate valve of the turbine (2), having a spindle (100) for rotatably mounting the flap arrangement (10) in a turbine housing (3);
a lever arm (200), the lever arm (200) being coupled to the spindle (100); and
a flap plate (300), the flap plate (300) being coupled to the lever arm (200);
characterized in that the flap plate (300) has a flexible part (330) in a radially outer region of the flap plate (300) such that by applying a closing force to the flap arrangement (10) when the flap plate (300) is in contact with a flap seat (500) in the turbine housing (3), elastic and/or plastic deformation of the flexible part (330) of the flap plate (300) can be caused to compensate for thermal deformations of the turbine housing (3), exhaust gas deposits and/or wear,
characterized in that at least one portion of the lever arm (200) is flexibly configured such that by applying a closing force to the flap arrangement (10) when the flap plate (300) is in contact with a flap seat (500) in the turbine housing (3), relative movement of the entire flap plate (300) relative to the spindle (100) is enabled to compensate for thermal deformations of the turbine housing (3), exhaust deposits and/or wear.

14. A flap arrangement according to claim 13, characterized in that only one or several portions (220) of the lever arm (200) are flexibly configured.

15. A flap arrangement according to claim 14, characterized in that the lever arm (200) is designed and arranged with respect to the spindle (100) and the flap disc (300) in such a way that the flexible portion (220) is substantially pressure-loaded by the closing force if no thermal deformations or wear of the turbine housing (3) occur or if no exhaust-gas deposits are present.

16. A flap arrangement according to claim 14, characterized in that the lever arm (200) has at least one first lever arm portion (230) and a second lever arm portion (240), one end (210) of the second lever arm portion (240) being coupled to the flap plate (300); the flexible portion or portions (220) being arranged in the region of the second lever arm portion (240), and/or in that the flexible portion or portions (220) is or are arranged in the region of the first lever arm portion (230).

17. A flap arrangement according to claim 13, characterized in that a predominant part of the lever arm (200), is of flexible design.

18. A turbine (2) for an exhaust-gas turbocharger (1) with a turbine housing (3); and
a wastegate valve suitable for routing exhaust-gas past a turbine wheel (4) of the turbine;
characterized in that the wastegate valve comprises a flap assembly (10) according to claim 13.

19. A flap arrangement (10) for a turbine (2) of an exhaust-gas turbocharger (1), in particular for a wastegate valve of the turbine (2), having a spindle (100) for rotatably mounting the flap arrangement (10) in a turbine housing (3);
a lever arm (200), the lever arm (200) being coupled to the spindle (100); and
a flap plate (300), the flap plate (300) being coupled to the lever arm (200);
characterized in that the flap plate (300) has a flexible part (330) in a radially outer region of the flap plate (300)

such that by applying a closing force to the flap arrangement (10) when the flap plate (300) is in contact with a flap seat (500) in the turbine housing (3), elastic and/or plastic deformation of the flexible part (330) of the flap plate (300) can be caused to compensate for thermal deformations of the turbine housing (3), exhaust gas deposits and/or wear, characterized in that the flap plate (300) and the lever arm (200) are dimensioned and have material properties, such that an angle ($\alpha$) of up to 3° can be compensated, when a torque in the range of from 0.8 to 20 Nm, is introduced into the spindle (100), wherein the angle ($\alpha$) is defined as the angle between the plane of the flap seat (500) and the plane of an underside (302) of the flap plate (300).

20. A turbine (2) for an exhaust-gas turbocharger (1) with a turbine housing (3); and a wastegate valve suitable for routing exhaust-gas past a turbine wheel (4) of the turbine;

characterized in that the wastegate valve comprises a flap assembly (10) according to claim 19.

\* \* \* \* \*